(12) United States Patent
Rubin

(10) Patent No.: US 10,858,234 B1
(45) Date of Patent: Dec. 8, 2020

(54) DRAIN SYSTEM WITH OVERFLOW PROTECTION

(71) Applicant: BHRS GROUP, Lakewood, NJ (US)

(72) Inventor: Jonathan Rubin, Lakewood, NJ (US)

(73) Assignee: BHRS GROUP, Lakewood, NJ (US)

( * ) Notice: Subject to any disclaimer, the term of this patent is extended or adjusted under 35 U.S.C. 154(b) by 0 days.

(21) Appl. No.: 16/547,141

(22) Filed: Aug. 21, 2019

Related U.S. Application Data

(60) Provisional application No. 62/865,409, filed on Jun. 24, 2019.

(51) Int. Cl.
| | |
|---|---|
| *B67D 1/12* | (2006.01) |
| *B67D 1/08* | (2006.01) |
| *B67D 1/00* | (2006.01) |
| *B67D 1/16* | (2006.01) |
| *G01F 23/30* | (2006.01) |
| *G01F 23/00* | (2006.01) |

(52) U.S. Cl.
CPC ......... *B67D 1/0878* (2013.01); *B67D 1/0014* (2013.01); *B67D 1/0888* (2013.01); *B67D 1/16* (2013.01); *G01F 23/0061* (2013.01); *G01F 23/30* (2013.01)

(58) Field of Classification Search
CPC .. B67D 1/0878; B67D 1/0014; B67D 1/0888; B67D 1/16; B67D 1/08; G01F 23/0061; G01F 23/30; G01F 23/00
See application file for complete search history.

(56) References Cited

U.S. PATENT DOCUMENTS

| | | | | |
|---|---|---|---|---|
| 3,351,239 A | * | 11/1967 | Flock | B67D 3/0003 222/54 |
| 5,325,897 A | * | 7/1994 | Richardson | G01N 1/2035 141/130 |
| 5,409,094 A | * | 4/1995 | Muraco | G07F 13/02 194/317 |
| 5,766,453 A | * | 6/1998 | Morellato | B01D 61/08 141/360 |
| 5,819,784 A | * | 10/1998 | Yoon | B01D 61/10 137/312 |
| 6,273,295 B1 | * | 8/2001 | Quartarone | B67D 1/0009 222/129.1 |
| 6,641,723 B2 | * | 11/2003 | Crowley | B67D 1/0004 210/198.1 |
| 6,679,400 B1 | * | 1/2004 | Goodman | B67D 1/16 137/312 |

(Continued)

*Primary Examiner* — Nicolas A Arnett
(74) *Attorney, Agent, or Firm* — Epstein Drangel LLP; Robert L. Epstein

(57) ABSTRACT

A water inlet pipe connects a water supply to a faucet. A water flow control valve in the water inlet pipe regulates the flow of water through the water inlet pipe from the water supply to the faucet. A drip tray located beneath the faucet captures water overflow. A conduit connects the drip tray a storage container such that water in the drip tray drains into the storage container. A water level sensor associated with the storage container generates a overflow signal when the water level in the storage container reaches a pre-set level. The water flow control valve automatically prevents water flow through the water inlet pipe to the faucet in response to the overflow signal. A visible display and a sound generator are also energized in response to the alarm signal.

10 Claims, 5 Drawing Sheets

(56) References Cited

U.S. PATENT DOCUMENTS

| | | | | |
|---|---|---|---|---|
| 6,871,675 B1* | 3/2005 | Marszalec | ............... | B67D 1/001 |
| | | | | 141/82 |
| 7,681,605 B2* | 3/2010 | Emes | ...................... | G07F 13/02 |
| | | | | 141/105 |
| 7,775,397 B2* | 8/2010 | Rivard | ................. | B67D 3/0038 |
| | | | | 222/69 |
| 8,281,821 B2* | 10/2012 | Spear | ................... | B67D 3/0032 |
| | | | | 141/82 |
| 8,448,821 B2* | 5/2013 | Hecht | ...................... | B67D 1/16 |
| | | | | 222/108 |
| 2009/0178727 A1* | 7/2009 | Murphy | ................. | F24F 13/22 |
| | | | | 141/35 |
| 2017/0152132 A1* | 6/2017 | Laible | ................. | B67D 1/0884 |

* cited by examiner

DRAIN SYSTEM WITH OVERFLOW PROTECTION

CROSS-REFERENCE TO RELATED APPLICATIONS

Priority is claimed on Provisional Patent Application Ser. No. 62/865,409, filed Jun. 24, 2019, which is incorporated herein in its entirety by reference.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to a water dispensing apparatus having a drip tray connected to an overflow storage container which automatically shuts off the water supply and generates an alarm when the storage container is full.

2. Description of Prior Art Including Information Disclosed Under 37 CFR 1.97 and 1.98

Machines for dispensing heated and/or cooled liquids such as water are well known. Water dispensing machines are typically connected to a water supply which may be a pipe of the water distribution system of the building where the machine is located or a large bottle which is mounted on the machine and must be replaced or refilled periodically. The machines dispense the water through a faucet or tap to a glass, bottle or other container in response to the depression of a pushbutton or lever which regulates the water flow through the faucet. Such machines commonly include filters and units which control the character of the water being dispensed including the temperature of the water, and whether the water is carbonated.

A drip tray is usually provided at a location below the faucet in order to catch any overflow which occurs during the water dispensing operation. In some installations, the drip tray is connected to the sewer system by a drain pipe and the water collected by the drip tray is disposed of through the sewer system of the building in which the machine is located. However, the drip trays in most water dispensing machines are not connected to drain and the overflow water collects in the drip tray until the drip tray is manually emptied.

If the overflow water in the drip tray is not periodically emptied, the overflow water will eventually exceed the capacity of the drip tray. When that occurs, the water will end up on the floor near the base of the water dispensing machine, a result which is not desirable.

Accordingly, there is a need for a drain system for a water dispensing machine in which the overflow water in the drip tray is allowed to drain into a storage container with a liquid capacity which is substantially larger than the liquid capacity of the drip tray. There is also a need for a drain system for a water dispensing machine in which the water supply is automatically shut off when the water level in the storage container reaches a pre-set level such that no additional water can enter the drip tray until the liquid in the storage container is emptied. There is also a need for a drain system for a water dispensing machine which will generate an audible and/or visible alarm when the storage container is filled to a pre-set level, to alert the user that the storage container must be emptied.

BRIEF SUMMARY OF THE INVENTION

In accordance with another aspect of the present invention, a water dispensing apparatus is provided. The water dispensing apparatus includes a water inlet pipe connecting a water supply to a faucet and a water flow control valve in the water inlet pipe which regulates the flow of water through the water inlet pipe from the water supply to the faucet. A drip tray is located beneath the faucet to capture water overflow. A storage container is provided. A conduit connects the drip tray and the storage container such that water in the drip tray drains into the storage container. A water level sensor is associated with the storage container. The flow control valve is automatically closed to prevent water flow through the water inlet pipe to the faucet when the water level in the storage container, as sensed by the level sensor, reaches a pre-set level.

The water dispensing apparatus also includes a visible display which is energized in response to the water level in the storage container, as sensed by the level sensor, reaching the pre-set level. The visual display may take the form of an LED display or other LED indicator associated with the cabinet of the water dispensing apparatus.

The water dispensing apparatus also includes a sound generator connected to the water level sensor which is energized to produce an audible alarm in response to the water level in the storage container, as sensed by the level sensor, reaching the pre-set level.

The water dispensing apparatus also includes a water filter associated with the water inlet pipe.

The water dispensing apparatus also includes a water character control unit associated with the water inlet pipe which regulates the temperature or other characteristic of the dispensed water.

The water flow control valve preferably takes the form of a solenoid valve.

The water level sensor may take the form of a mechanical sensor such as a float, a light sensor or a moisture sensor.

BRIEF DESCRIPTION OF THE SEVERAL VIEWS OF DRAWINGS

To these and to such other objects that may hereinafter appears, the present invention relates to a water dispensing apparatus having a drain system with overflow protection as described in detail in the following specification and recited in the annexed claims, taken together with the accompanying drawings, in which like numerals refer to like parts and in which:

DETAILED DESCRIPTION OF THE INVENTION

Figure 1:
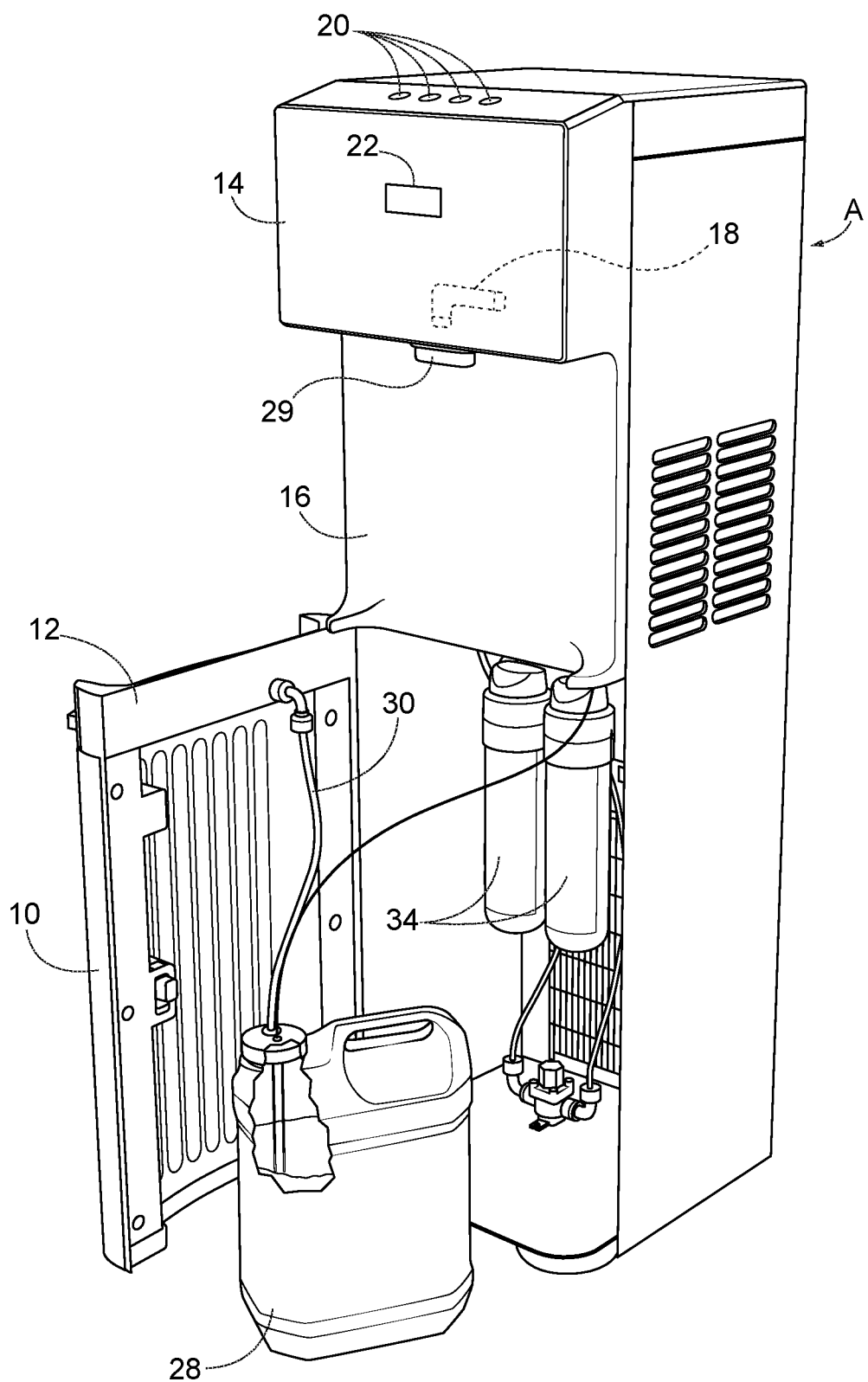
FIG. 1 is a perspective view of the water dispensing apparatus of the present invention with the cabinet door open and the overflow storage container removed from the cabinet.
Figure 2:
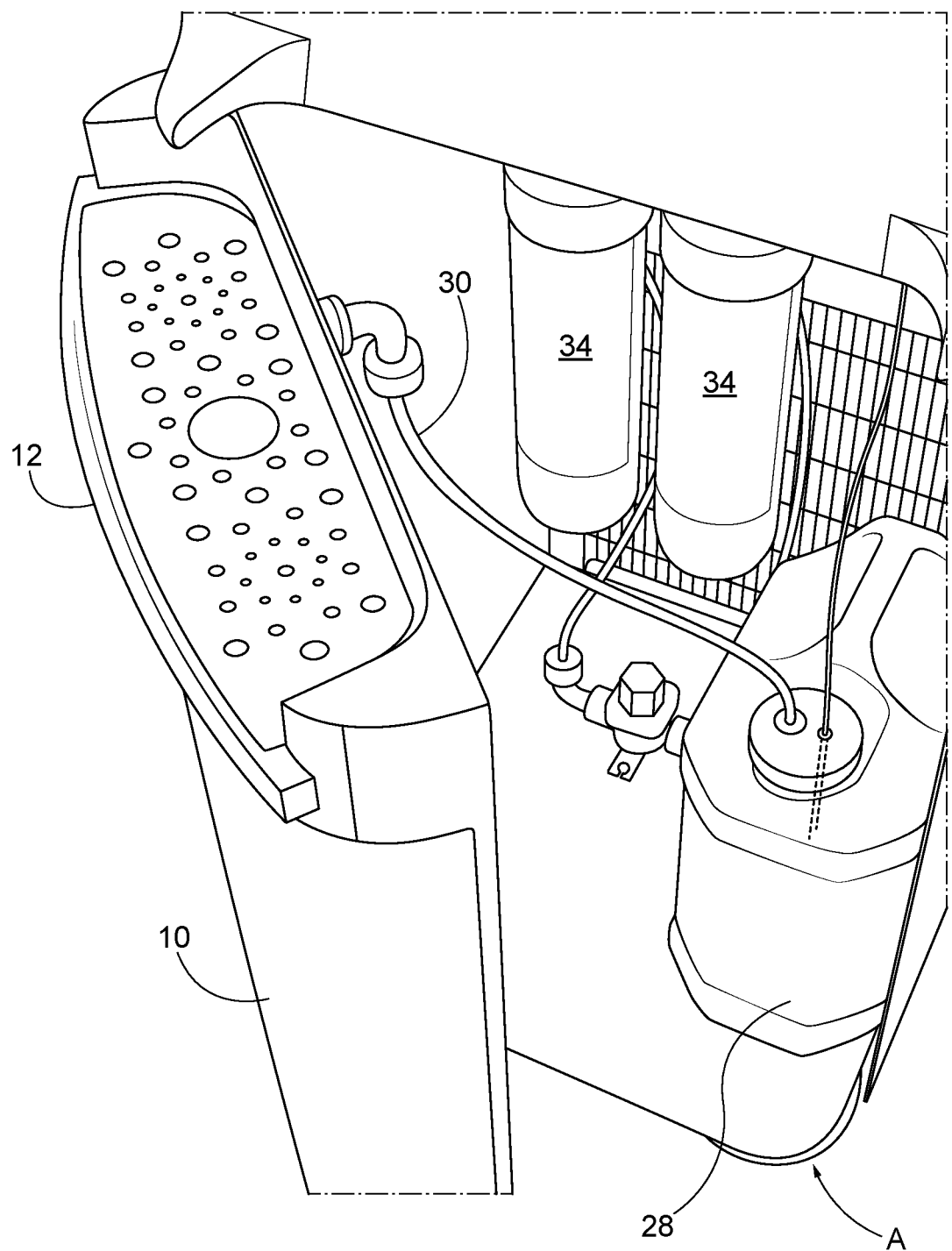
FIG. 2 is a perspective view of a portion of the water dispensing apparatus of FIG. 1 with the cabinet door open showing the drip tray and the overflow storage container in place within the cabinet.

As illustrated in the drawings, the water dispensing apparatus of the present invention includes a cabinet, generally designated A, which contains the components of the apparatus. The cabinet includes a front access door 10 connected to the cabinet by a hinge which can be opened to access the components in the cabinet.

A drip tray 12 is mounted on the upper portion of access door 10. The top section 14 of cabinet A protrudes outwardly beyond the middle section 16 of the cabinet and contains the water outlet faucet 18, the water selector buttons 20, the overflow status display 22, the overflow status alarm 24 and the microprocessor 26 which controls the functions of the components.

The protruding section 14 of the cabinet has an open hole for the spout. Section 14 protrudes outwardly beyond the middle section 16 such that a glass, small bottle or other container (not shown) can be inserted under and aligned with faucet 18. Water is dispensed into the glass, small bottle or other container from the faucet in response to the depression of the electronic buttons 20 on top of the unit.

When access door 10 is closed, the drip tray 12 is aligned with faucet 18 in order to catch any water from faucet 18 which is not received in the glass, small bottle or other container. Drip tray 12 is connected to a storage container 28 by a tube 30. Water from drip tray 12 drains into storage container 28 through tube 30 and collects in storage container 28, which may be a plastic or glass bottle, preferably of substantially greater liquid capacity than the drip tray.

The water dispensing apparatus is connected to a water supply. The water supply may be a large bottle of water, of the type which is commonly situated upside down on the top of the cabinet. However, in the preferred embodiment of the apparatus which is illustrated, the water supply pipe 32 is connected to the water supply system of the building in which the water dispensing apparatus is located.

Water inlet pipe 32 connects the water supply to faucet 18 through a filtration system including filters 34, a water character control unit 36 and a flow control valve 38. Flow control valve 38 may be a solenoid valve or any other type of electrically controlled valve. Valve 38 controls the flow of water through the inlet pipe to the faucet.

When buttons 20 are depressed, a signal is sent by a control circuit 26 which causes flow control valve 38 to open, such that water can be dispensed through faucet 18.

The filtration system may include one or more water filter canisters 34. In the preferred embodiment, two water filter canisters 34 are illustrated.

Before being dispensed through faucet 18, water passes through the water character control unit 36. Unit 36 regulates the character of the water in accordance with the selector buttons 20 selected by the user. Buttons 20 are situated on top of the cabinet. For example, the user may select chilled water, heated water, carbonated water or non-carbonated water by depressing the appropriate button.

Control circuit 26 may be a micro-processor or the like which regulates the operation of the water dispensing apparatus. Circuit 26 receives signals from the selector buttons 20 and causes the water character control unit to provide water with the desired characteristics to the faucet.

A level sensor 40 is associated with storage container 28. Level sensor 40 detects the level of the water in the storage container. Sensor 40 may take the form of any type of level sensor including a mechanical sensor such as a float, a light sensor or a moisture detector.

Sensor 40 is connected to control circuit 26. When the liquid level in storage container 28 reaches a pre-set level, sensor 40 sends an overflow signal to circuit 26. In response to the overflow signal, circuit 26 causes the flow control valve 38 to automatically to close, preventing any water from being dispensed through the faucet. Circuit 26 will continue to keep the flow control valve in the closed state, even if buttons 20 are depressed, until the storage container is emptied, and the system is reset.

Figure 3:
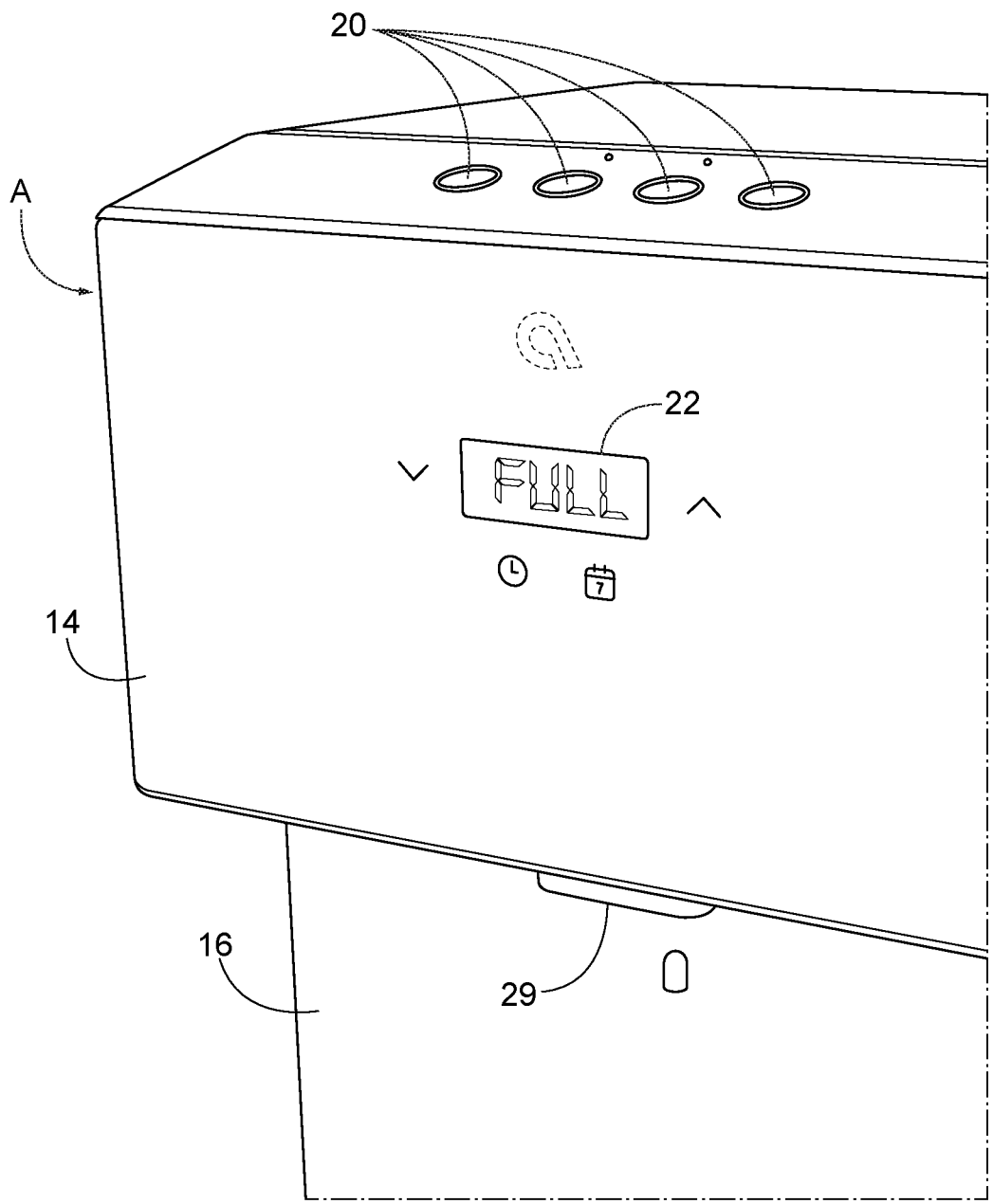
FIG. 3 is a perspective view of the top portion of the cabinet showing the water control dispensing buttons and the overflow storage status display.
Figure 4:
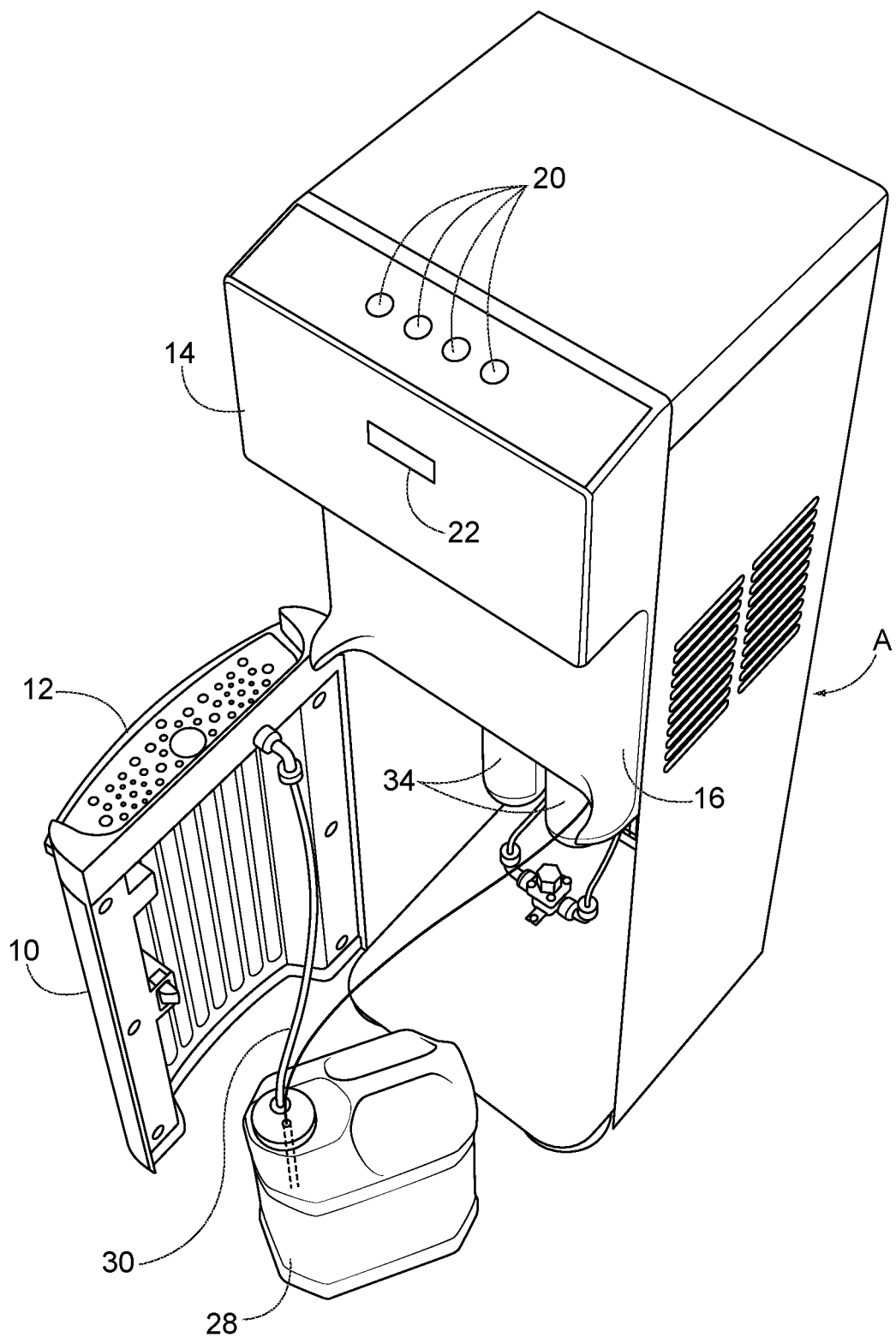
FIG. 4 is a perspective view of the apparatus of FIG. 1 showing the drip tray on the upper section of the cabinet door.
Figure 5:
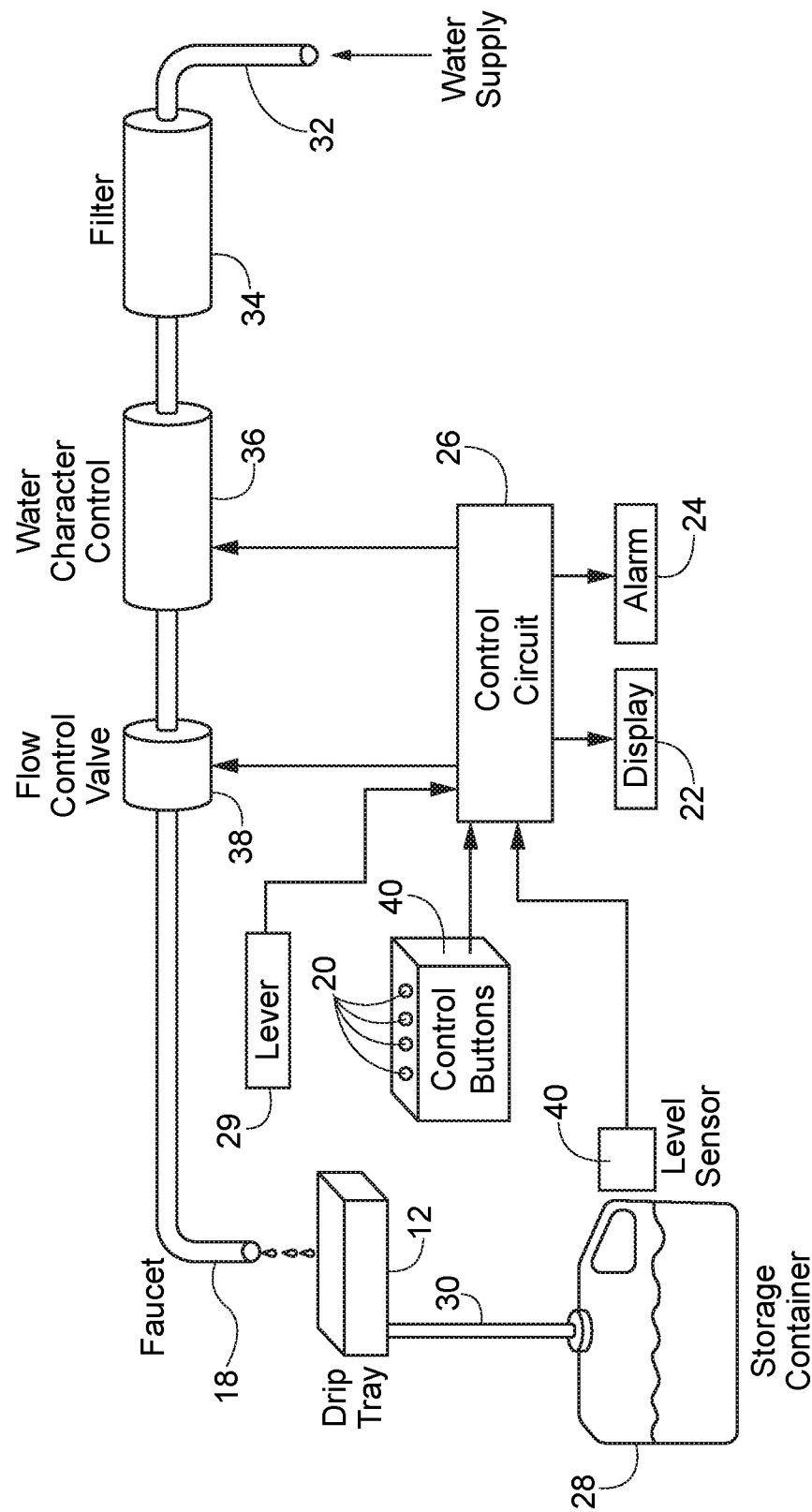
FIG. 5 is block diagram of the major components of the water dispensing apparatus of the present invention showing the water flow connections and flow controls.

Further, in response to the overflow signal, the control circuit generates an alarm signal. The alarm signal is sent to an overflow status display 22 and an audible sound generator 24. The alarm signal from circuit 26 energizes a visible display 22 to indicate that the overflow container requires emptying, such as some kind of LED indicator that it is full either by means of a light, icon, or words displayed. as illustrated in FIG. 3. Preferably, the alarm signal from circuit 28 also energizes sound generator 24 to broadcast an audible alarm indicating the overflow container requires emptying.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims:

I claim:

1. Water dispensing apparatus for use with a water supply, said apparatus comprising a water inlet pipe connected to the water supply, and a faucet, said water inlet pipe connecting the water supply to said faucet, a flow control valve in said water inlet pipe which regulates the flow of water through said water inlet pipe to said faucet, a drip tray located beneath said faucet adapted to capture water overflow, a storage container, a conduit connecting said drip tray and said storage container such that water from said drip tray drains into said storage container, a level sensor associated with said storage container, said flow control valve automatically closing to prevent water flow through said water inlet pipe to said faucet when the water level in the storage container, as sensed by said level sensor, reaches a pre-set level.

2. The water dispensing apparatus of claim 1 further comprising an overflow display energized to indicate that the water level in the storage container, as sensed by said level sensor, has reached the pre-set level.

3. The water dispensing apparatus of claim 1 further comprising a sound generator energized to produce an audible alarm when the water level in the storage container, as sensed by said level sensor, reaches the pre-set level.

4. The water dispensing apparatus of claim 1 further comprising a water filter associated with said water inlet pipe.

5. The water dispensing apparatus of claim 1 further comprising a water character control unit associate with said water inlet pipe.

6. The water dispensing apparatus of claim 1 wherein said water flow control valve is a solenoid valve.

7. The water dispensing apparatus of claim 1 wherein said water level sensor takes the form of a mechanical sensor, a float, a light sensor or a moisture sensor.

8. Water dispensing apparatus for use with a water supply, said apparatus comprising a water inlet pipe connected to the water supply, and a faucet, said water inlet pipe connecting the water supply to said faucet, a flow control valve in said water inlet pipe which regulates the flow of water through said water inlet pipe to said faucet, a drip tray located beneath said faucet adapted to capture water overflow, a storage container, a conduit connecting said drip tray and said storage container such that water from said drip tray drains into said storage container, a level sensor associated with said storage container, said flow control valve automatically closing to prevent water flow through said water inlet pipe to said faucet when the water level in the storage container, as sensed by said level sensor, reaches a pre-set level, an overflow display energized to indicate when the water level in the storage container, as sensed by said level sensor, reaches the pre-set level, and a sound generator energized to provide an audible alarm when the water level in the storage container, as sensed by said level sensor, reaches the pre-set level.

9. The water dispensing apparatus of claim 8 further comprising a water filter and a water character control unit associated with said water inlet pipe.

10. The water dispensing apparatus of claim 8 wherein said water flow control valve is a solenoid valve and said water level sensor takes the form of a mechanical sensor, a float, a light sensor or a moisture sensor.

\* \* \* \* \*